United States Patent
Du et al.

(10) Patent No.: US 9,749,684 B2
(45) Date of Patent: Aug. 29, 2017

(54) MULTIMEDIA PROCESSING METHOD AND MULTIMEDIA APPARATUS

(71) Applicant: Beijing Zhigu Rui Tuo Tech Co., Ltd, Beijing (CN)

(72) Inventors: Lin Du, Beijing (CN); Wei Shi, Beijing (CN)

(73) Assignee: BEIJING ZHIGU RUI TUO TECH CO., LTD, Beijing (CN)

(*) Notice: Subject to any disclaimer, the term of this patent is extended or adjusted under 35 U.S.C. 154(b) by 0 days.

(21) Appl. No.: 15/109,627

(22) PCT Filed: Dec. 29, 2014

(86) PCT No.: PCT/CN2014/095258
§ 371 (c)(1),
(2) Date: Jul. 1, 2016

(87) PCT Pub. No.: WO2015/101247
PCT Pub. Date: Jul. 9, 2015

(65) Prior Publication Data
US 2016/0330512 A1    Nov. 10, 2016

(30) Foreign Application Priority Data
Jan. 3, 2014    (CN) .......................... 2014 1 0003618

(51) Int. Cl.
*H04N 21/439*    (2011.01)
*G10L 25/57*    (2013.01)
(Continued)

(52) U.S. Cl.
CPC ......... *H04N 21/4394* (2013.01); *G06F 3/165* (2013.01); *G10L 25/30* (2013.01);
(Continued)

(58) Field of Classification Search
CPC ........... H04N 21/4394; H04N 21/4728; H04N 21/439; H04N 5/607; G06F 3/165
See application file for complete search history.

(56) References Cited

U.S. PATENT DOCUMENTS

| 4,990,286 A | 2/1991 | Gordon | |
| 2004/0237111 A1* | 11/2004 | Iraclianos | B60K 35/00 725/75 |

(Continued)

FOREIGN PATENT DOCUMENTS

| CN | 1126026 C | 10/2003 |
| CN | 1901663 A | 1/2007 |

(Continued)

OTHER PUBLICATIONS

Kobayashi, et al. "Sound source localization with non-calibrated microphones", in Proceeding MMM'08 Proceedings of the 14th international conference on Advances in multimedia modeling, Jan. 2008, 10 pages.

(Continued)

*Primary Examiner* — Michael Teitelbaum
(74) *Attorney, Agent, or Firm* — Amin, Turocy & Watson, LLP (57) ABSTRACT

A multimedia processing method comprises: obtaining, according to sound data, sound information that corresponds to a sound having at least one predefined feature; analyzing image data associated with the sound data and a current image display parameter and determining a display area according to the sound information; obtaining, according to the display area, information about a perceptual sound source location that corresponds to the sound information; and processing the sound data according to the information about the perceptual sound source location and a current sound playback parameter to obtain processed sound data corresponding to the information about the perceptual sound (Continued)

source location. Relevant sound data and image data are processed, to cause processed sound data to adapt to a current sound playback module and a display module, so that the sound effect of sound information corresponding to the sound data can be accurately reproduced, thereby improving user experience.

24 Claims, 6 Drawing Sheets

(51) Int. Cl.
*H04N 21/4728* (2011.01)
*G06F 3/16* (2006.01)
*G10L 25/30* (2013.01)
*H04N 21/81* (2011.01)
*H04N 7/04* (2006.01)

(52) U.S. Cl.
CPC .............. *G10L 25/57* (2013.01); *H04N 7/04* (2013.01); *H04N 21/4728* (2013.01); *H04N 21/8106* (2013.01)

(56) References Cited

U.S. PATENT DOCUMENTS

| | | | |
|---|---|---|---|
| 2007/0202917 | A1 | 8/2007 | Phelps et al. |
| 2008/0085019 | A1 | 4/2008 | Wagenaars et al. |
| 2011/0045905 | A1* | 2/2011 | Radek ............... G07F 17/32 463/31 |
| 2013/0094672 | A1* | 4/2013 | Liang ................ H04N 7/15 381/119 |
| 2013/0342730 | A1 | 12/2013 | Lee et al. |

FOREIGN PATENT DOCUMENTS

| | | |
|---|---|---|
| CN | 101820565 A | 9/2010 |
| CN | 102480671 A | 5/2012 |
| CN | 102547533 A | 7/2012 |
| CN | 104036789 A | 9/2014 |
| EP | 1035732 A1 | 9/2000 |
| WO | 2012064285 A1 | 5/2012 |

OTHER PUBLICATIONS

International Search Report mailed Apr. 3, 2015 for PCT Application No. PCT/CN2014/095258, 2 pages.

* cited by examiner

MULTIMEDIA PROCESSING METHOD AND MULTIMEDIA APPARATUS

RELATED APPLICATION

The present application is a U.S. National Stage filing under 35 U.S.C. §371 of international patent cooperation treaty (PCT) application No. PCT/CN2014/095258, filed Dec. 29, 2014, and entitled "MULTIMEDIA PROCESSING METHOD AND MULTIMEDIA APPARATUS", which claims the benefit of priority to Chinese Patent Application No. 201410003618.3, filed on Jan. 3, 2014, which applications are hereby incorporated into the present application by reference herein in their respective entireties.

TECHNICAL FIELD

The present application relates to the field of multimedia technologies, and in particular, to a multimedia processing method and a multimedia apparatus.

BACKGROUND

Currently, a multimedia apparatus generally includes two parts: image display and sound playback. Since image display and sound playback are generally completed by different devices, the two parts generally are associated with each other only in time, but not in space. The size of common media apparatuses varies greatly, ranging from a few inches (such as a mobile phone device and a tablet computer) to tens of inches (such as a laptop, a desktop, and a television screen) and even to hundreds of inches (such as an outdoor advertising screen), and accordingly the size and distribution of corresponding sound player devices also vary greatly. Most of current video file formats fail to take spatial information of sounds into account, making it difficult for a client to accurately reproduce the sound effect.

SUMMARY

An example objective of the present application is to provide a multimedia processing technology.

In a first example aspect, an embodiment of the present application provides a multimedia processing method, comprising:
  obtaining, according to sound data, sound information that corresponds to a sound having at least one predefined feature;
  analyzing image data associated with the sound data and a current image display parameter to determine a display area corresponding to the sound information;
  obtaining, according to the display area, information about a perceptual sound source location that corresponds to the sound information; and
  processing the sound data according to the information about the perceptual sound source location and a current sound playback parameter to obtain processed sound data corresponding to the information about the perceptual sound source location.

In a second example aspect, an embodiment of the present application provides a multimedia apparatus, comprising:
  a sound information acquisition module, configured to obtain, according to sound data, sound information that corresponds to a sound having at least one predefined feature;
  a display area determining module, configured to analyze image data associated with the sound data and a current image display parameter to determine a display area corresponding to the sound information;
  a sound source location acquisition module, configured to obtain, according to the display area, information about a perceptual sound source location that corresponds to the sound information; and
  a sound data processing module, configured to process the sound data according to the information about the perceptual sound source location and a current sound playback parameter to obtain processed sound data corresponding to the information about the perceptual sound source location.

According to at least one example technical solution of the embodiments of the present application, relevant sound data and image data are processed, to cause processed sound data to adapt to a current sound playback module and a current display module, so that for multimedia apparatuses of various sizes and distributions, the sound effect of sound information corresponding to the sound data and the image data can be accurately reproduced, thereby improving user experience.

DETAILED DESCRIPTION

Embodiments of the present application are further described in detail below with reference to the accompanying drawings (in which like elements are denoted by like reference numerals) and embodiments. The following embodiments are intended to describe the present application, but not to limit the scope of the present application.

Figure 1:
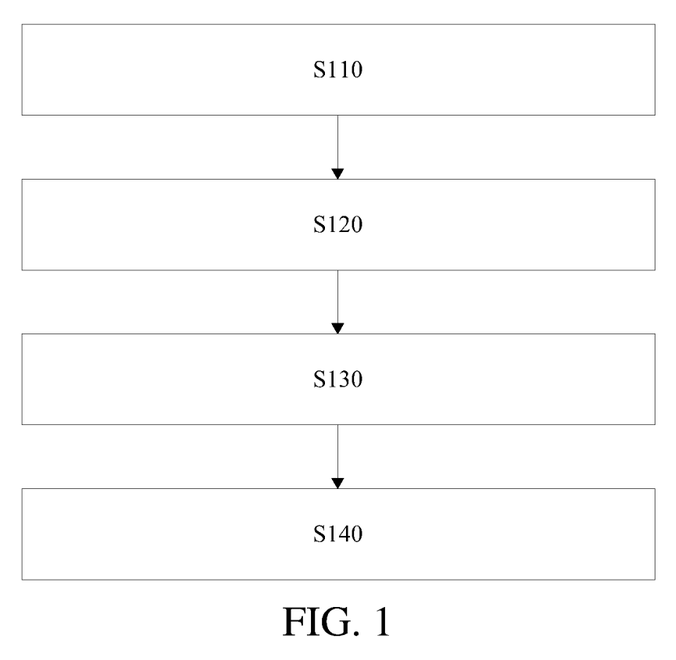
FIG. 1 is an example flowchart of a multimedia processing method according to an embodiment of the present application.

As shown in FIG. 1, one example implementation of the embodiments of the present application provides a multimedia processing method, comprising:
  S110: obtaining, according to sound data, sound information that corresponds to a sound having at least one predefined feature;
  S120: analyzing image data associated with the sound data and a current image display parameter and determining a display area corresponding to the sound information;
  S130: obtaining, according to the display area, information about a perceptual sound source location that corresponds to the sound information; and
  S140: processing the sound data according to the information about the perceptual sound source location and a current sound playback parameter to obtain processed sound data corresponding to the information about the perceptual sound source location.

According to at least one technical solution of the embodiments of the present application, relevant sound data and image data are processed, to cause processed sound data to adapt to a current sound playback module and a display module, so that for multimedia apparatuses of various sizes and distributions, the sound effect of sound information corresponding to the sound data and the image data can be accurately reproduced, thereby improving user experience.

The steps of the method of the embodiments of the present application are further described below.

S110: Obtain, according to sound data, sound information that corresponds to a sound having at least one predefined feature.

In this example implementation, the at least one predefined feature comprises at least one of the following: a frequency, a period, a variation rule, and a feature value corresponding to a feature extraction algorithm. Herein, when the at least one predefined feature is a feature value corresponding to a feature extraction algorithm, the sound having the at least one predefined feature means the sound having the feature value, that is, the feature value can be obtained by processing sound data corresponding to the sound by using the feature extraction algorithm.

An example implementation of the step S110 comprises:
by using a pattern matching algorithm such as Neural Network or Gaussian Mixture Model, recognizing the sound having the at least one predefined feature in the sound data, and then obtaining the sound information corresponding to the sound.

For example, pattern matching is performed for the sound data by using the pattern matching algorithm, and it is found that the sound data contains data corresponding to a voice. In this case, the sound having the at least one predefined feature is the voice. For example, the at least one predefined feature of the voice comprises: a particular period, spectrum, short-time energy and the like. When it is determined by using the pattern matching algorithm that the sound data contains a sound component having the particular period, spectrum, short-time energy and the like, it is considered that the sound data is contains voice-related data, and in this case, sound information corresponding to the voice is then generated.

In the embodiments of the present application, the sound information comprises object information corresponding to the sound. For example, an object corresponding to the voice is a person; or for example, when the sound is recognized as a bark, the object of the sound is a dog.

Certainly, in some example implementations, the sound information may be some particular feature values of the sound, such as the period, the frequency, or a feature value corresponding to an algorithm. In subsequent steps, matching of feature values is directly performed between the particular feature value and a feature value of a corresponding image in the image data, without the need to perform semantic recognition.

In an example implementation, when the sound data is multi-track sound data, not only the foregoing sound information, but also an original sound source location corresponding to the sound can be obtained according to the multi-track sound data. For example, an original perceptual sound source location of the sound is calculated by using differences between sound data components, corresponding to the sound, in sound data of different tracks based on a method such as time difference of arrival (TDOA). The perceptual sound source location herein refers to a sound source location, corresponding to a sound, formed in the brain of a user after hearing the sound.

S120: Analyze image data associated with the sound data and a current image display parameter to determine a display area corresponding to the sound information.

In an example implementation, the step S120 comprises:
analyzing the image data to obtain image content information corresponding to the sound information; and
obtaining the display area according to the image content information and the current image display parameter.

In this example implementation, by using an image recognition and segmentation method, at least one image area can be obtained by segmenting an image corresponding to the image data, and an image area corresponding to the object information of the sound in the sound information is found in the at least one image area, and then image content information corresponding to the found image area is obtained. Herein, the image content information comprises: image area information (for example, information about the location in the image), object information corresponding to an image area, and the like.

In other example implementations, the image data may comprise image metadata, where the image metadata comprises image area information corresponding to all objects in an image corresponding to the image data. For example, the image corresponding to the image data contains a person, a dog, a wall, and a chair, and then the image metadata comprises:

an object 1: a person; an image area corresponding to the object 1: (O1x1, O1y1; O1x2, O1y2);
an object 2: a dog; an image area corresponding to the object 2: (O2x1, O2y1; O2x2, O2y2);
an object 3: a wall; an image area corresponding to the object 3: (O3x1, O3y1; O3x2, O3y2); and
an object 4: a chair; an image area corresponding to the object 4: (O4x1, 43y1; O4x2, O4y2).

Certainly, in other example implementations, the image metadata may comprise more detailed information, for example, various parts of a person (head, arm, torso, leg, and the like) and corresponding image areas; and may further comprise some feature information of an object, for example, features of a person further comprise: child, male and the like, and features of a dog further comprise: black, Labrador and the like.

In this example implementation, image area information corresponding to an object can be found, without the need to perform processing such as image recognition and segmentation on the image data, in the image metadata of the image data directly according to the object information corresponding to the sound information, for example, according to that the object is a dog.

Certainly, in another example implementation of the embodiments of the present application, the image area corresponding to the sound information may also be obtained by directly performing matching between the corresponding particular feature value in the sound information and the feature value of the image corresponding to the image area, as described in the step S110.

In this example implementation, the current image display parameter comprises: the size and location information of a current overall display area. A display area of the image area in the current overall display area can be obtained according to the information about the location of the image area in the image.

In another example implementation, the step S120 comprises:

analyzing the image data and obtaining at least one image content information and at least one display area respectively corresponding to the at least one image content information according to the current image display parameter; and determining the display area corresponding to the sound information in the at least one display area according to the sound information and the at least one image content information.

In this example implementation, by using the method described above, image recognition and segmentation may be performed for all objects in the image corresponding to the image data to obtain image content information that comprises the image areas corresponding to all the objects and the object information corresponding to the image areas, and then display areas respectively corresponding to the image areas are obtained according to the current image display parameter.

Then, the display area corresponding to the sound information is found from the display areas according to the sound information, for example, by performing matching between the object information corresponding to the sound and the object information in the image content information.

In some cases, for example, when multiple persons are present in the image corresponding to the image data, if a sound corresponding to a voice is detected in the sound data, it may be difficult to determine the person corresponding to the voice. Therefore, in the embodiments of the present application, when the sound data is multi-track sound data, an original perceptual sound source location corresponding to the voice can be obtained by using the method recorded in the further description of the step S110, and therefore, the object corresponding to the sound information can be more accurately determined according to the original perceptual sound source location and the location of each object in the image. In addition, by using the perceptual sound source location corresponding to the sound, a range to be matched against an object corresponding to the sound can be reduced in the process of determining a corresponding display area in the step S120.

S130: Obtain, according to the display area, information about a perceptual sound source location that corresponds to the sound information.

In the step S130, the perceptual sound source location may be determined according to the location of the display area in the overall display area. For example, when the display area corresponding to the sound information is in the left of the overall display area, the obtained perceptual sound source location is also in the left.

In addition, depth information of the perceptual sound source location and the like may also be determined according to the size of the display area. For example, according to the principle that a closer object appears larger, the larger the corresponding display area of an object in the overall display area is, the closer its corresponding perceptual sound source location is to an audience, and vice versa.

S140: Process the sound data according to the information about the perceptual sound source location and a current sound playback parameter to obtain processed sound data corresponding to the information about the perceptual sound source location.

In this example implementation, the current sound playback parameter comprises parameter information of the current sound playback module, for example, a parameter such as the distribution, size or performance of the sound playback module.

In an example implementation, the sound playback module comprises a plurality of sound playback units.

The current sound playback parameter comprises: current parameter information of the plurality of sound playback units.

Herein, the parameter information of the sound playback unit comprises, for example, a parameter such as the distribution, size or performance of the sound playback unit, or a sound data track corresponding to the sound playback unit.

In this example implementation, the processed sound data corresponding to the information about the perceptual sound source location means that when the sound playback module corresponding to the sound playback parameter plays the sound according to the processed sound data, a user who hears the sound having the at least one predefined feature will think that the sound source location of the sound corresponds to the information about the perceptual sound source location.

The step S140 of this example implementation is further described below by using examples in which the sound data is single-track sound data and multi-track sound data respectively.

In an example implementation, when the sound data is single-track sound data, and the sound playback module comprises a plurality of separately distributed sound playback units, the processing the sound data according to the information about the perceptual sound source location and a current sound playback parameter may be:

determining a sound playback unit corresponding to the perceptual sound source location according to the information about the perceptual sound source location and the current sound playback parameter, and processing the sound data to cause the sound corresponding to the sound information to be played only by the determined sound playback unit.

For example, the sound playback module is a transparent thin-film sound playback module disposed on the surface of the display area, and is divided into a plurality of sound playback units distributed along the surface of the display area, and when the object corresponding to the sound information is a bark, the sound data is processed to cause a sound playback unit corresponding to the location of a dog's head in the display image to play the bark.

In another example implementation, when the sound data is multi-track sound data, and the sound playback module comprises a plurality of separately distributed sound playback units, the processing the sound data according to the information about the perceptual sound source location and a current sound playback parameter may be:

adjusting the phase and/or amplitude of a sound data component corresponding to the sound in sound data of each track according to the information about the perceptual sound source location and the current sound playback parameter sound data to cause the sound played by the sound playback module according to the adjusted multi-track sound data to give the audience a feeling that the sound is produced from the perceptual sound source location.

In one example implementation, for example, a new sound data component corresponding to the sound may be synthesized according to the perceptual sound source location and the parameter of the sound playback unit by using a wave field synthesis (WFS) algorithm, and then the sound data is adjusted according to the sound data component, so as to obtain the processed sound data. Certainly, in addition to the foregoing WFS algorithm, other suitable sound synthesis algorithms may also be used in the embodiments of the present application to obtain the processed sound data.

Figure 2:
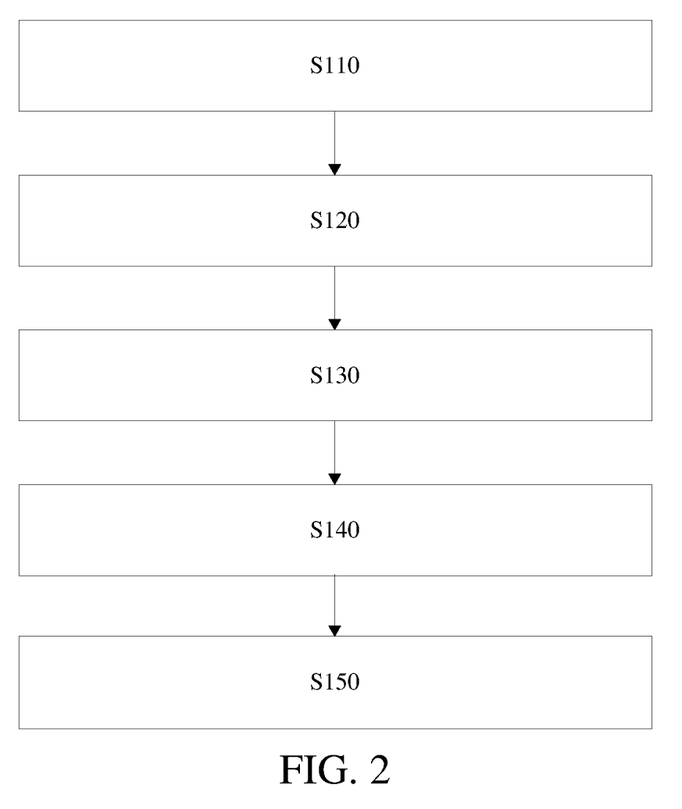
FIG. 2 is an example flowchart of another multimedia processing method according to an embodiment of the present application.

As shown in FIG. 2, in another example implementation of the embodiments of the present application, after the processed sound data is obtained, the method further comprises:

S150: Play the sound according to the processed sound data.

In the example implementation as shown in FIG. 1 or FIG. 2, the method may further comprise:

storing at least one of the following information: the sound information, the display area, the perceptual sound source location, and the processed sound data.

One or more pieces of data in the foregoing process are stored, so that when the same multimedia data (comprising the sound data and the relevant image data) is played by a same or similar multimedia apparatus, some data processing steps can be omitted, thereby improving the efficiency.

It should be understood that in various embodiments of the present application, the value of the serial number of each step described above does not mean an execution sequence, and the execution sequence of each step should be determined according to the function and internal logic thereof, and should not be any limitation on the example implementation procedure of the embodiments of the present application.

Figure 3:
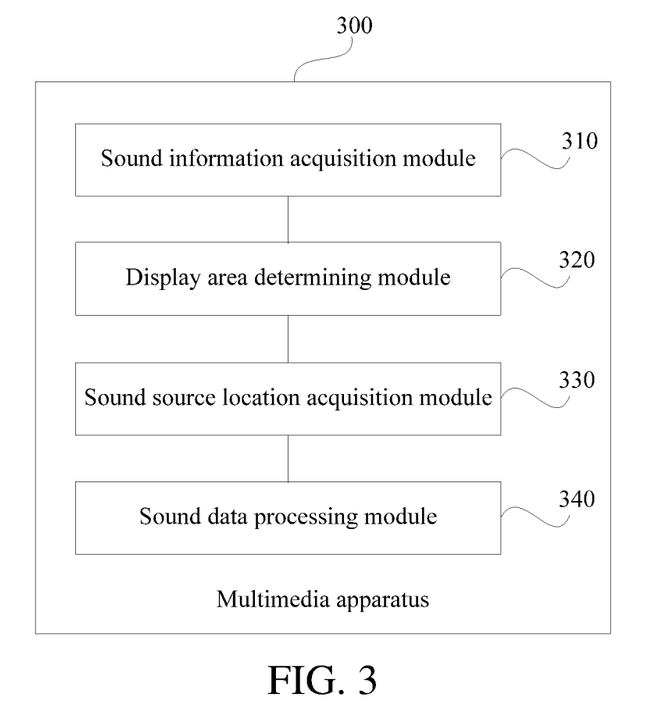
FIG. 3 is an example schematic structural block diagram of a multimedia apparatus according to an embodiment of the present application.

FIG. 3 is a schematic structural diagram of a multimedia apparatus 300 according to an embodiment of the present application. The multimedia apparatus 300 comprises:

a sound information acquisition module 310, configured to obtain, according to sound data, sound information that corresponds to a sound having at least one predefined feature;

a display area determining module 320, configured to analyze image data associated with the sound data and a current image display parameter to determine a display area corresponding to the sound information;

a sound source location acquisition module 330, configured to obtain, according to the display area, information about a perceptual sound source location that corresponds to the sound information; and a sound data processing module 340, configured to process the sound data according to the information about the perceptual sound source location and a current sound playback parameter to obtain processed sound data corresponding to the information about the perceptual sound source location.

According to at least one technical solution of the embodiments of the present application, relevant sound data and image data are processed, to cause processed sound data to adapt to a current sound playback module and a display module, so that for various multimedia apparatuses, the sound effect of sound information corresponding to the sound data can be accurately reproduced, thereby improving user experience.

In an example implementation of the embodiments of the present application, the sound information acquisition module 310 is further configured to recognize the sound having the at least one predefined feature in the sound data by using a pattern matching algorithm, and then obtain the sound information corresponding to the sound.

Herein, the sound information may comprise object information corresponding to the sound.

In another example implementation, when the sound data is multi-track sound data, not only the foregoing sound information, but also an original sound source location corresponding to the sound can be obtained according to the multi-track sound data. In this way, the display area determining module 320 can accurately determine the corresponding display area according to the sound information.

Figure 4A:
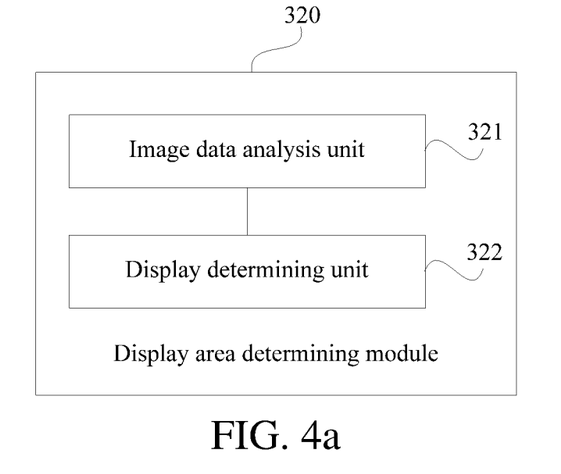
FIG. 4a and FIG. 4b are respectively example schematic structural block diagrams of two types of display area determining modules of a multimedia apparatus according to an embodiment of the present application.

As shown in FIG. 4a, in an example implementation of the embodiments of the present application, the display area determining module 320 comprises:

an image data analysis unit 321, configured to analyze the image data to obtain image content information corresponding to the sound information; and a display determining unit 322, configured to obtain the display area according to the image content information and the current image display parameter.

The method of obtaining the display area corresponding to the sound information by using the image data analysis unit 321 and the display determining unit 322 is the same as that described in the foregoing method embodiment, and details are not described herein again.

Figure 4B:
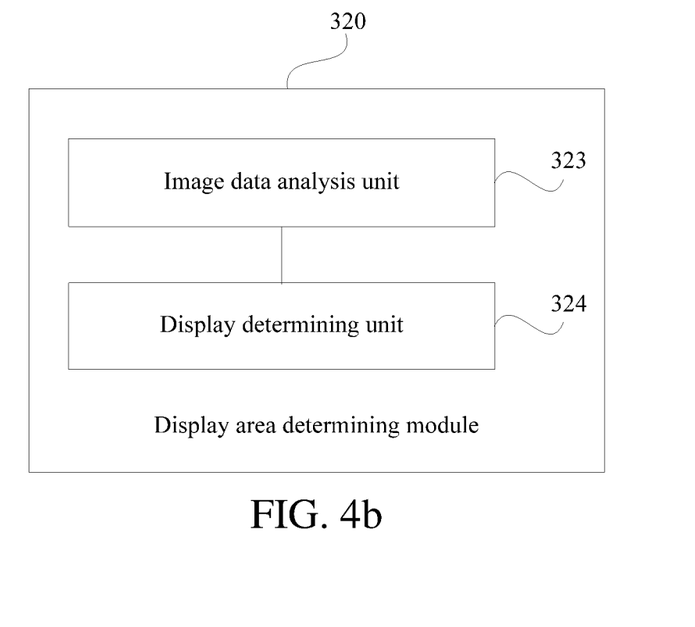

As shown in FIG. 4b, in another example implementation of the embodiments of the present application, the display area determining module 320 comprises:

an image data analysis unit 323, configured to analyze the image data and obtain, according to the current image display parameter, at least one image content information and at least one display area respectively corresponding to the at least one image content information; and a display determining unit 324, configured to determine, according to the sound information and the at least one image content information, the display area corresponding to the sound information in the at least one display area.

The method of obtaining the display area corresponding to the sound information by using the image data analysis unit 323 and the display determining unit 324 is the same as that described in the foregoing method embodiment, and details are not described herein again.

Figure 5:
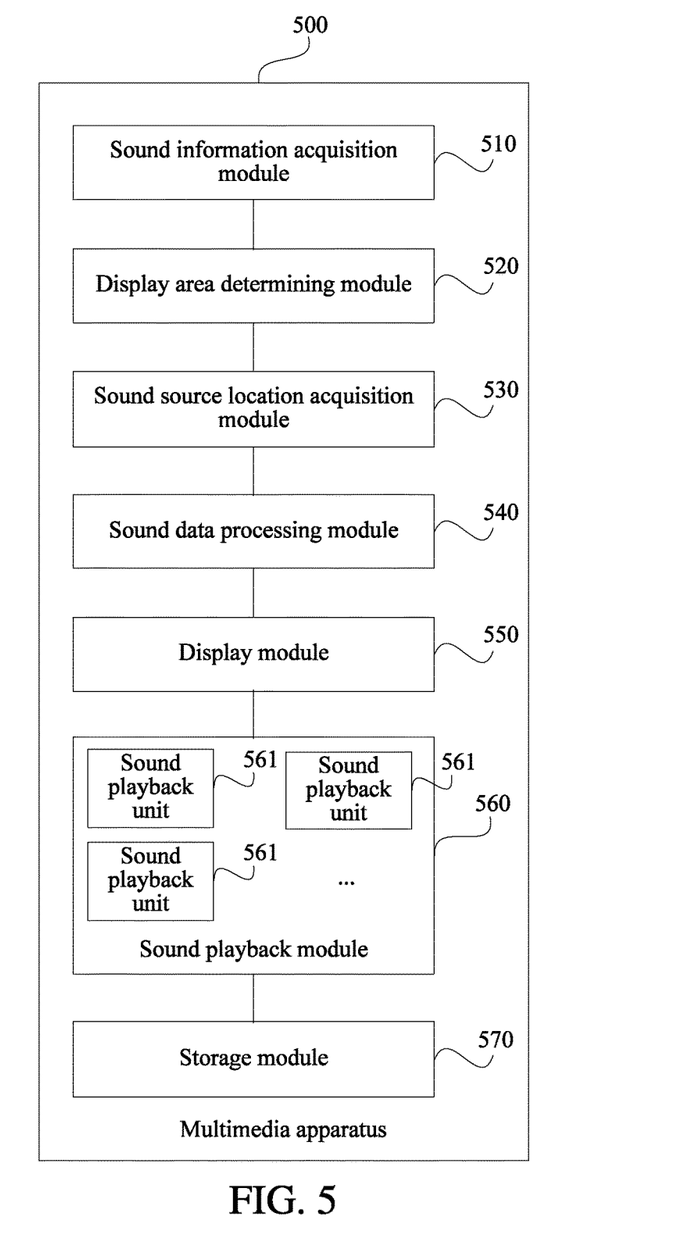
FIG. 5 is an example schematic structural block diagram of another multimedia apparatus according to an embodiment of the present application.

As shown in FIG. 5, in an example implementation of the embodiments of the present application, the apparatus not only comprises a sound information acquisition module 510, a display area determining module 520, a sound source location acquisition module 530 and a sound data processing module 540 which are that the same as those of the multimedia apparatus in the embodiment described in FIG. 3 or FIG. 4, but also further comprises:

a display module 550, configured to perform displaying according to the image data; and a sound playback module 560, configured to play the sound according to the processed sound data.

In this example implementation, the current image display parameter comprises: the size and location information of a current overall display area of the display module 550.

The current sound playback parameter comprises: parameter information of the sound playback module 560, for example, a parameter such as the distribution, size or performance of the sound playback module.

In an example implementation, the sound playback module 560 comprises a plurality of sound playback units 561.

In this case, the current sound playback parameter comprises: current parameter information of each sound playback unit 561.

In this example implementation, the processed sound data comprises: sound playback unit information corresponding to the information about the perceptual sound source location. Therefore, in this example implementation, the sound playback module 560 uses a sound playback unit corresponding to the sound playback unit information in the processed sound data to play the sound corresponding to the sound information.

In this example implementation, the multimedia apparatus 500 further comprises:

a storage module 570, configured to store at least one of the following information: the sound information, the display area, the perceptual sound source location, and the processed sound data.

The advent of a transparent loudspeaker, particularly a thin-film transparent loudspeaker (for example, a transparent gel loudspeaker, in which another layer of transparent saline gel is added on the surface of a transparent ionic gel thin film, and after being electrified, the entire thin film rapidly deforms, to produce a full-range sound) makes it possible to apply the loudspeaker to display screens. For example, if a layer of thin-film transparent loudspeaker is disposed on the surface of a display area of an electronic device having a display function, and therefore there is no need to dispose a loudspeaker around the display area of the electronic device and there is no need to connect an external loudspeaker to the electronic device. The applicant of this application finds that when the sound playback module of the multimedia apparatus is the foregoing transparent loudspeaker applied to display screens, a phenomenon of inconsistency between the sound playback effect of the multimedia apparatus and the space of the displayed picture becomes more obvious as the size of the display screen varies. Therefore, when the foregoing method and apparatus of the present application are applied to the multimedia apparatus having a transparent sound playback module, the phenomenon of inconsistency between the sound playback effect and the space of the display picture can be well solved.

For example implementation procedures of the foregoing modules and units, refer to the corresponding descriptions in the method embodiments shown in FIG. 1 to FIG. 2, and details are not described herein again.

Figure 6:
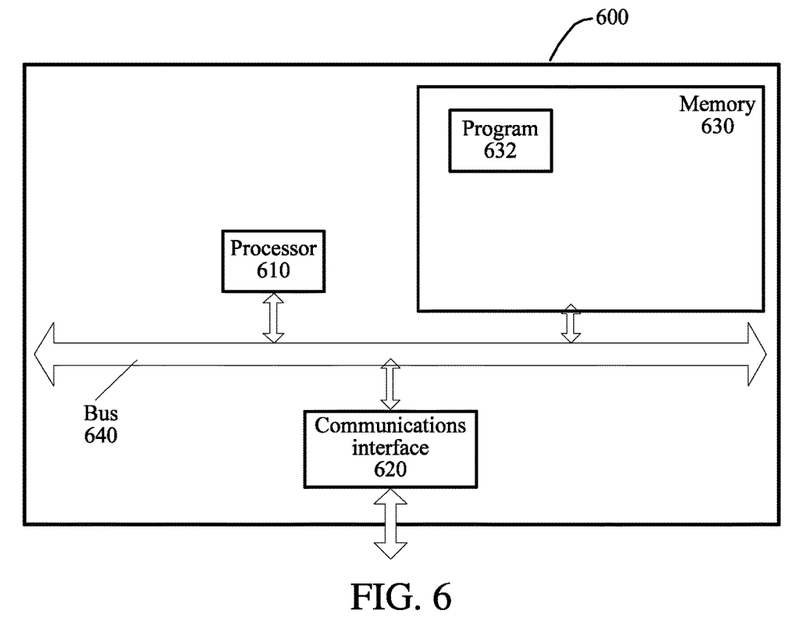
FIG. 6 is an example schematic structural block diagram of still another multimedia apparatus according to an embodiment of the present application.

FIG. 6 is a schematic structural diagram of a multimedia apparatus 600 according to an embodiment of the present application. The specific embodiments of the present application are not intended to limit the example implementation of the multimedia apparatus 600. As shown in FIG. 6, the multimedia apparatus 600 may comprise:

a processor 610, a communications interface 620, a memory 630, and a communications bus 640.

The processor 610, the communications interface 620, and the memory 630 communicate with each other by using the communications bus 640.

The communications interface 620 is configured to communicate with a network element such as a client.

The processor 610 is configured to execute a program 632. Specifically, the processor 710 can perform relevant steps in the foregoing method embodiment.

Specifically, the program 632 may comprise program code, where the program code comprises a computer operation instruction.

The processor 610 may be a central processing unit (CPU), an application specific integrated circuit (ASIC), or one or more integrated circuits configured to implement the embodiments of the present application.

The memory 630 is configured to store the program 632. The memory 630 may comprise a high-speed random access memory (RAM) memory, and may also comprise a non-volatile memory such as at least one magnetic disk storage. The program 632 can be specifically used to cause the multimedia apparatus 600 to perform the following steps:

obtaining, according to sound data, sound information that corresponds to a sound having at least one predefined feature;

analyzing image data associated with the sound data and a current image display parameter and determining a display area according to the sound information;

obtaining, according to the display area, information about a perceptual sound source location that corresponds to the sound information; and processing the sound data according to the information about the perceptual sound source location and a current sound playback parameter to obtain processed sound data corresponding to the information about the perceptual sound source location.

For the example implementation of the steps in the program 632, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

The above embodiments are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:
1. A method, comprising:
obtaining, by a device comprising a processor according to sound data, sound information that corresponds to a sound having at least one predefined feature, wherein the sound information comprises: object information corresponding to the sound having the at least one predefined feature;
determining a display area corresponding to the sound information according to image data associated with the sound data, a current image display parameter and the sound information;
obtaining, according to the display area, information about a perceptual sound source location that corresponds to the sound information; and
processing the sound data according to the information about the perceptual sound source location and a current sound playback parameter to obtain processed sound data corresponding to the information about the perceptual sound source location.

2. The method of claim 1, wherein the determining a display area corresponding to the sound information comprises:
determining, according to the image data and the sound information, image content information corresponding to the sound information; and
obtaining the display area according to the image content information and the current image display parameter.

3. The method of claim 1, wherein the determining a display area corresponding to the sound information comprises:
analyzing the image data and obtaining, according to the current image display parameter, at least one image content information and at least one display area respectively corresponding to the at least one image content information; and
determining, according to the sound information and the at least one image content information, the display area corresponding to the sound information in the at least one display area.

4. The method of claim 1, wherein the sound data is multi-track sound data.

5. The method of claim 4, wherein the sound information further comprises: original sound source location information corresponding to the sound having the at least one predefined feature.

6. The method of claim 1, wherein the current image display parameter comprises: the size and location information of a current overall display area.

7. The method of claim 6, wherein the current sound playback parameter comprises: parameter information of a current sound playback module.

8. The method of claim 7, wherein the sound playback module comprises a plurality of sound playback units; and
the current sound playback parameter comprises: current parameter information of the plurality of sound playback units.

9. The method of claim 8, wherein the processed sound data comprises:
sound playback unit information corresponding to the information about the perceptual sound source location.

10. The method of claim 9, wherein the method further comprises:
determining at least one sound playback unit in the plurality of sound playback units corresponding to the sound playback unit information.

11. The method of claim 1, wherein the method further comprises:
playing the sound according to the processed sound data.

12. The method of claim 1, wherein the method further comprises:
storing at least one of the following information: the sound information, the display area, the perceptual sound source location, and the processed sound data.

13. An apparatus, comprising:
a processor, coupled to a memory, that executes or facilitates execution of executable modules, comprising:
a sound information acquisition module configured to obtain, according to sound data, sound information that corresponds to a sound having at least one predefined feature;
a display area determining module configured to analyze image data associated with the sound data and a current image display parameter to determine a display area corresponding to the sound information;
a sound source location acquisition module configured to obtain, according to the display area, information about a perceptual sound source location that corresponds to the sound information; and
a sound data processing module configured to process the sound data according to the information about the perceptual sound source location and a current sound playback parameter to obtain processed sound data corresponding to the information about the perceptual sound source location;
wherein the sound information comprises: object information corresponding to the sound having the at least one predefined feature; and
the display area determining module is further configured to analyze the image data associated with the sound data and the current image display parameter and determine a display area according to the object information.

14. The apparatus of claim 13, wherein the display area determining module comprises:
an image data analysis unit configured to determine, according to the image data and the sound information, image content information corresponding to the sound information; and
a display determining unit configured to obtain the display area according to the image content information and the current image display parameter.

15. The apparatus of claim 13, wherein the display area determining module comprises:
an image data analysis unit configured to analyze the image data and obtain, according to the current image display parameter, at least one image content information and at least one display area respectively corresponding to the at least one image content information; and
a display determining unit configured to determine, according to the sound information and the at least one image content information, the display area corresponding to the sound information in the at least one display area.

16. The apparatus of claim 13, wherein the sound data is multi-track sound data; and
the sound information acquisition module is configured to obtain, according to the multi-track sound data, sound information that corresponds to a sound having at least one predefined feature.

17. The apparatus of claim 16, wherein the sound information further comprises: original sound source location information corresponding to the sound having the at least one predefined feature; and
the display area determining module is further configured to analyze the image data associated with the sound data and the current image display parameter and determine a display area according to the object information and the original sound source location information.

18. The apparatus of claim 13, wherein the executable modules further comprise:
a display module configured to perform displaying according to the image data; and
the current image display parameter comprises: the size and location information of a current overall display area of the display module.

19. The apparatus of claim 18, wherein the executable modules further comprise:
a sound playback module configured to play the sound according to the processed sound data; and
the current sound playback parameter comprises: parameter information of the sound playback module.

20. The apparatus of claim 19, wherein the sound playback module comprises a plurality of sound playback units; and
the current sound playback parameter comprises: parameter information of each current sound playback unit of the plurality of sound playback units.

21. The apparatus of claim 20, wherein the processed sound data comprises:
sound playback unit information corresponding to the information about the perceptual sound source location.

22. The apparatus of claim 18, wherein the sound playback module is a transparent sound playback module and the transparent sound playback module at least partially covers the display module.

23. The apparatus of claim 13, wherein the executable modules further comprise:
a storage module configured to store at least one of the sound information, the display area, the perceptual sound source location, or the processed sound data.

24. A computer readable storage device comprising executable instructions that, in response to execution, cause a device comprising a processor to perform operations, comprising:
obtaining, according to sound data, sound information that corresponds to a sound having a predefined feature, wherein the sound information comprises: object information corresponding to the sound having the at least one predefined feature;
determining a display area corresponding to the sound information according to image data associated with the sound data a current image display parameter and the sound information;
obtaining, according to the display area, information about a perceptual sound source location that corresponds to the sound information; and
processing the sound data according to the information about the perceptual sound source location and a current sound playback parameter to obtain processed sound data corresponding to the information about the perceptual sound source location.

* * * * *